B. WEHNER.
DRILLING MACHINE.
APPLICATION FILED JAN. 26, 1910.

1,148,640.

Patented Aug. 3, 1915.
5 SHEETS—SHEET 4.

WITNESSES:
C. L. Belcher

INVENTOR
Benjamin Wehner
BY
ATTORNEY

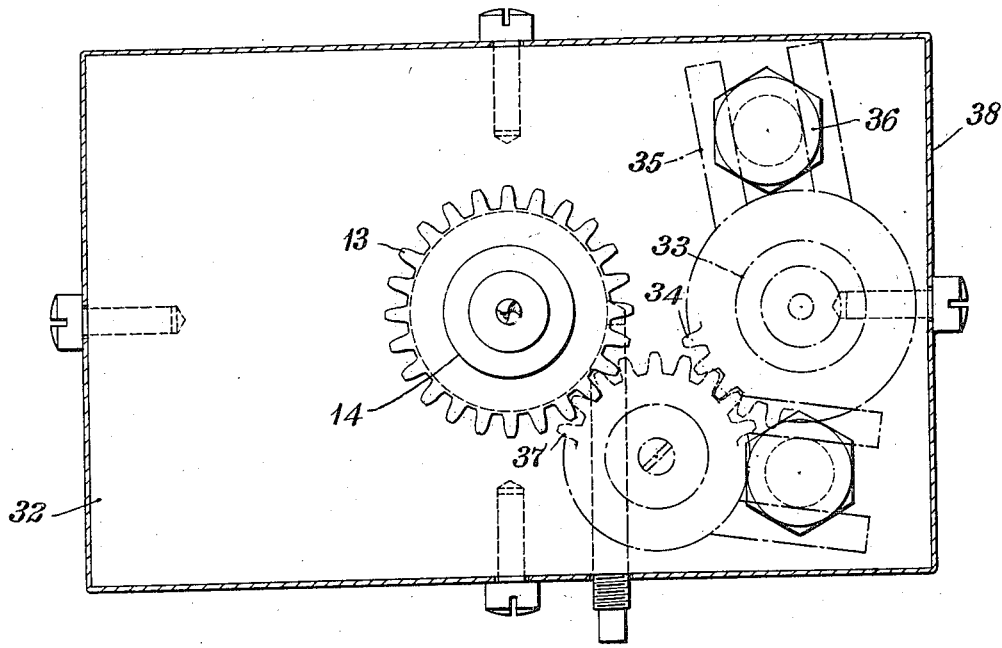
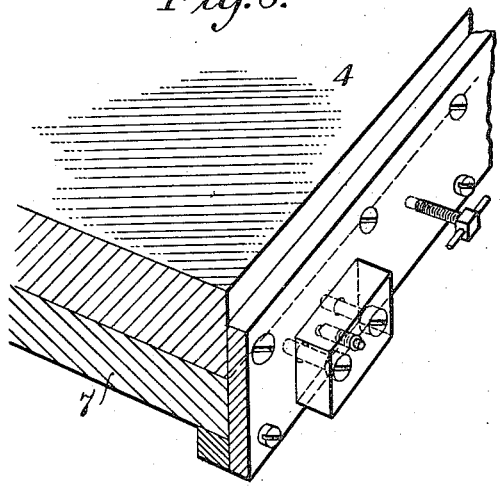
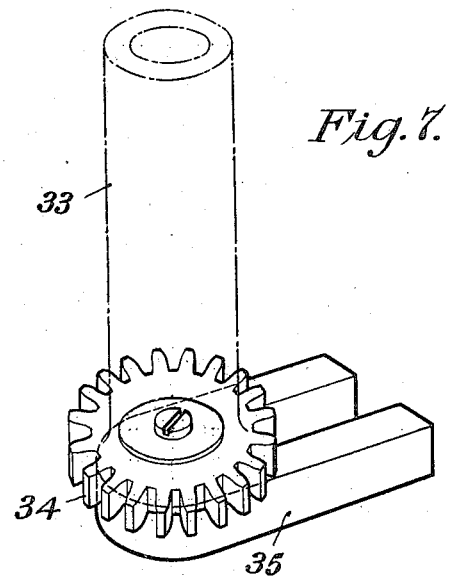

UNITED STATES PATENT OFFICE.

BENJAMIN WEHNER, OF NORTH BRADDOCK, PENNSYLVANIA, ASSIGNOR TO WESTINGHOUSE ELECTRIC AND MANUFACTURING COMPANY, A CORPORATION OF PENNSYLVANIA.

DRILLING-MACHINE.

1,148,640.

Specification of Letters Patent.

Patented Aug. 3, 1915.

Application filed January 26, 1910. Serial No. 540,211.

*To all whom it may concern:*

Be it known that I, BENJAMIN WEHNER, a citizen of the United States, and a resident of North Braddock, in the county of Allegheny and State of Pennsylvania, have invented a new and useful Improvement in Drilling-Machines, of which the following is a specification.

My invention relates to machine tools and particularly to vertical drilling machines.

The object of my invention is to provide a simple and durable drilling machine that shall be adapted for drilling holes in marble, slate, soapstone and other similar substances and that may be conveniently operated and adjusted.

When ordinary forms of drilling machines are employed for drilling holes in slate or marble face plates for electric circuit controllers and rheostats, and other similar devices, the process is very slow by reason of the fact that the drill becomes clogged with the fine powder which is gradually cut away from the face plate as the drill is rotated. The process is quite different from that of drilling holes in steel or cast iron and other materials from which chips can be cut by the point and carried away by the flutes of the drill.

According to my present invention, I provide a novel drilling machine in which the arrangement of parts is such that the action of gravity tends to separate the fine particles which are cut away from the slat or marble which is being drilled as fast as they are loosened from the body of the mass, thereby permitting the drill to be fed at a maximum rate and the work to be done with a maximum efficiency. Various structural improvements will be hereinafter set forth.

Figure 1:
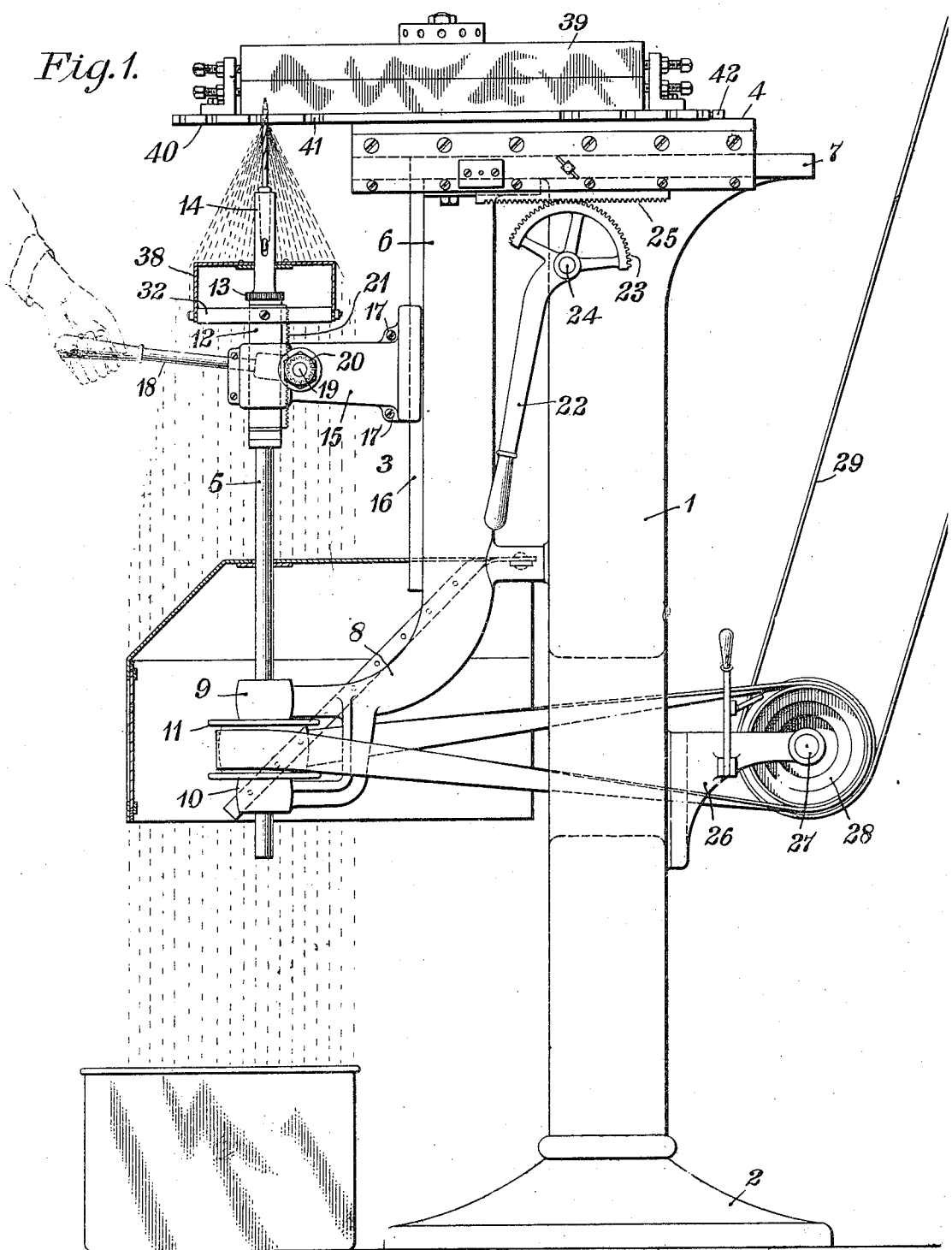
Figure 2:
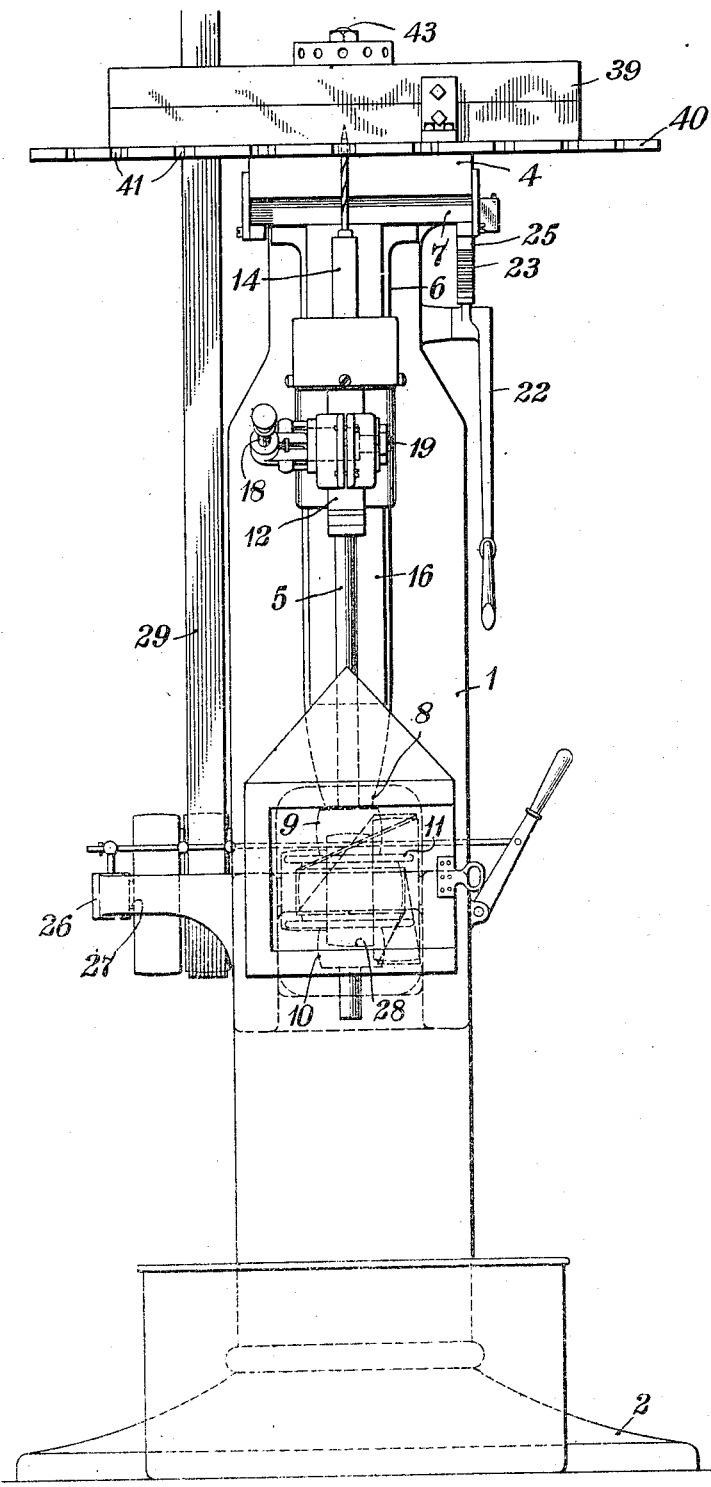
Figure 3:
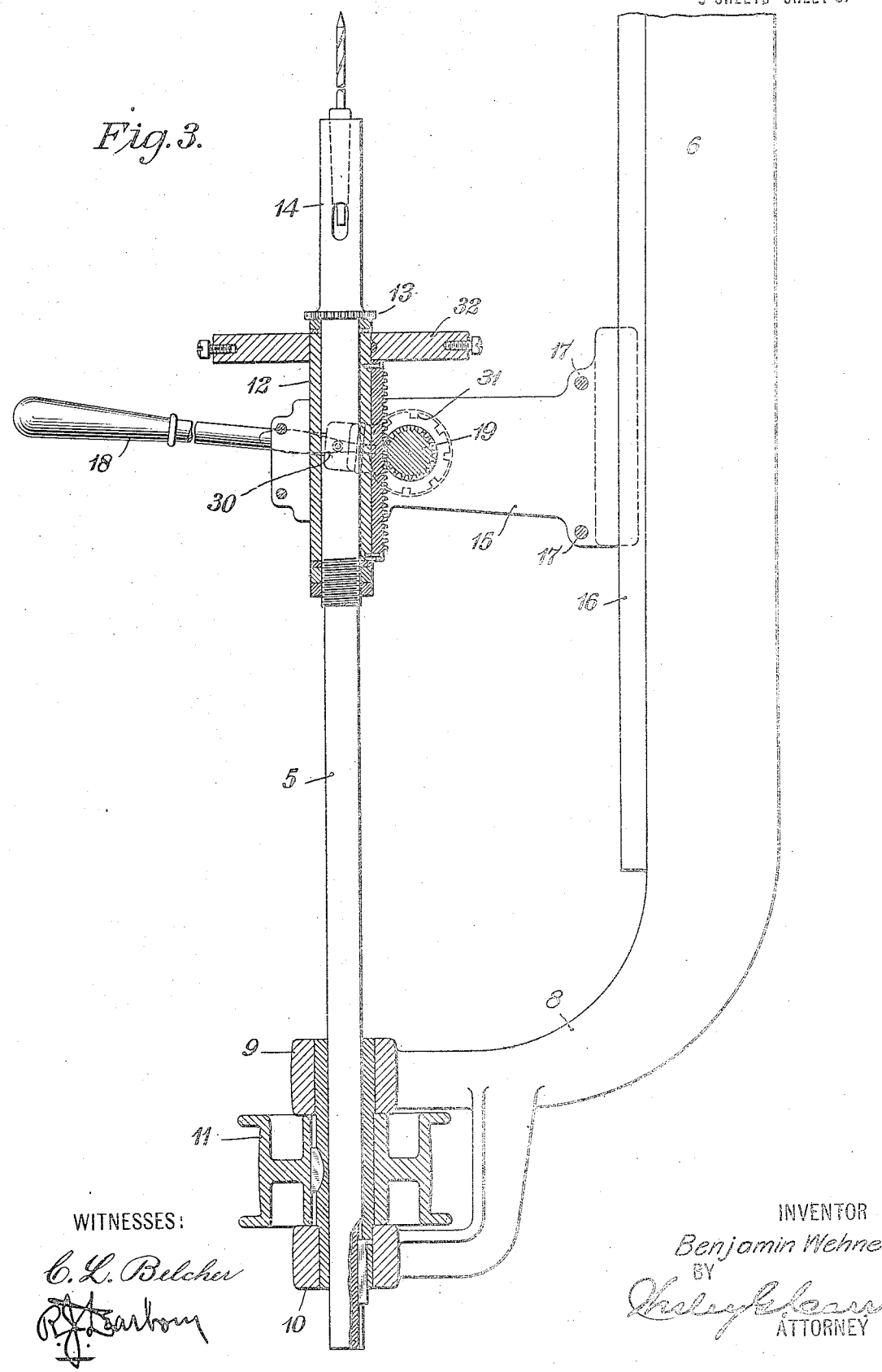
Figure 4:
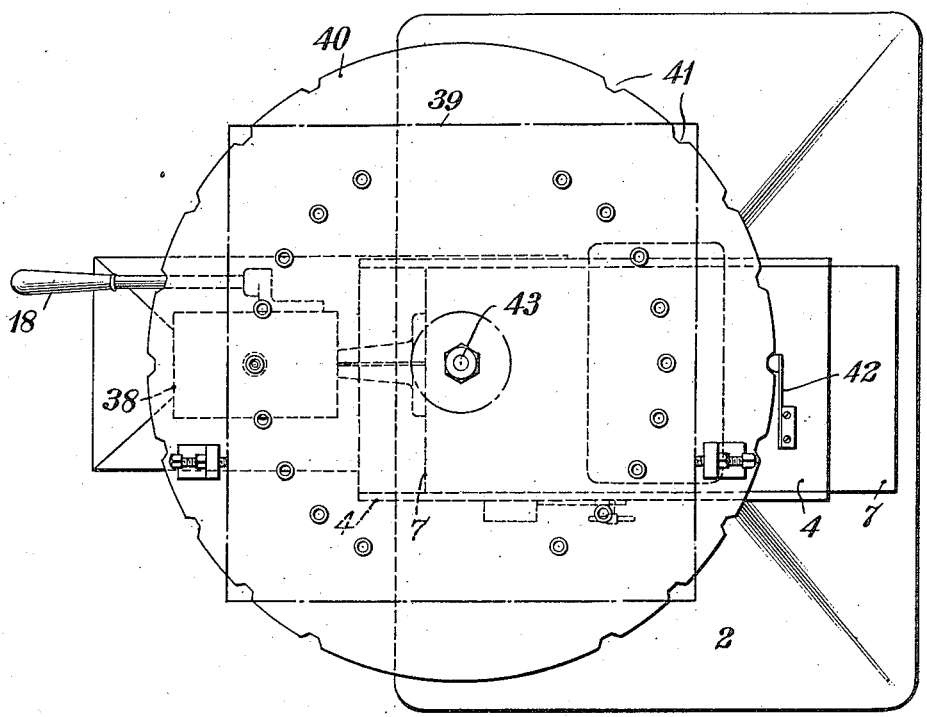
Figure 5:
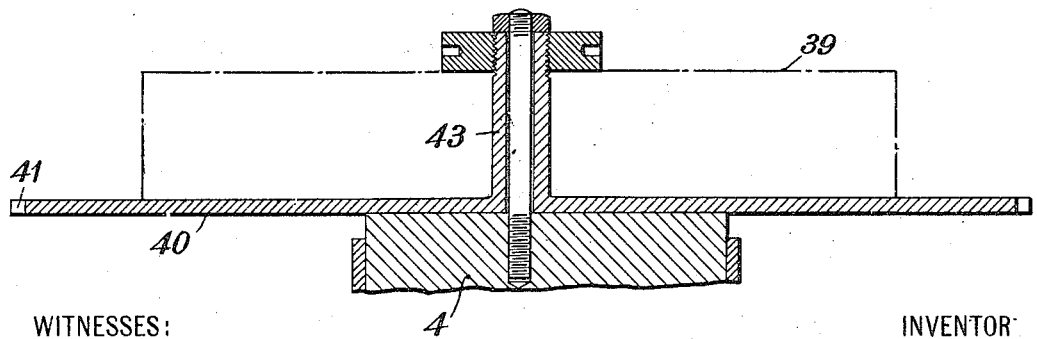

Figure 1 of the accompanying drawings is a view mainly in side elevation but partially in section of a drilling machine constructed in accordance with my invention, Fig. 2 is an elevation, at right angles to that of Fig. 1. Fig. 3 is a partially sectional elevation, on a larger scale, of the spindle and supporting brackets. Figs. 4 and 5 are, respectively, a plan and sectional elevation of the adjustable carriage of the machine to which the work is secured, Fig. 6 is a plan view of an intermediate plate or surface which is secured to the spindle sleeve and may be provided with attachments for carrying other drill spindles to be driven directly from the main spindle, the box or casing for said parts being shown in section. Fig. 7 is a perspective view of the auxiliary parts which are shown in plan in Fig. 6. Fig. 8 is a perspective cross-sectional view showing the detailed structure of the carriage of Fig. 1.

Referring to the drawings, the machine here illustrated comprises a stationary standard or body member 1 having an enlarged base 2 adapted to rest upon and to be bolted to the floor or to some horizontal supporting plane, a spindle bracket 3, a carriage 4 to which the bed plate is secured, and a spindle 5. The spindle bracket 3 comprises a body 6 which depends from a bed plate 7 on which the carriage 4 is mounted, and an outwardly extending arm 8 at its lower end having bearings 9 and 10 in which the spindle 5 is supported. The extremity of the arm is bifurcated so that a driving pulley 11 may be secured to the spindle and disposed between the two portions of the arm, in a well known manner.

The spindle 5 is mounted in a sleeve 12 and is provided with a gear wheel 13 that is rigidly secured to it or is integral with it and rests upon the upper end of the sleeve 12. The upper end 14 of the spindle 5 is bored out to receive the usual tapered shank of a standard drill. The sleeve 12 is prevented from turning by a guide bracket 15 on which it is adjustably supported. The bracket 15 is mounted on a vertical guide way 16, of dove-tailed section, provided on the adjacent surface of the body 6 of the spindle bracket. The bracket is preferably split for some distance from the guide way and bolts 17 are provided by which it may be clamped thereto. The spindle is fed by a handle lever 18 which is adapted to rotate a shaft 19 having a gear 20 mounted on it which meshes with a rack 21 on the sleeve 12.

The carriage 4 is adjustably mounted on the bed plate 7 and may be moved to any desired position, by means of an adjusting handle 22 and gear segment 23 which is rotatably mounted on a shaft 24, the gear segment being adapted to mesh with a rack 25 with which the carriage is provided.

The body member 1 of the drill press is provided with a bracket 26 having a shaft 27 on which a cone or stepped pulley 28 is mounted. The machine may be driven by any suitable means, such as a belt 29 for the cone pulley 28, which, in turn, is belted to the spindle pulley 11.

As shown in Fig. 3 of the drawings, the handle lever 18 is preferably connected to the shaft 19 by means of a pawl 30 and a ratchet 31 in order that it may always be kept at a convenient angle for the operator.

An intermediate plate 32 is secured to the upper end of the sleeve 12 and is adapted to receive auxiliary drill holders or short spindles such as the holder 33 (see Figs. 6 and 7) which comprises a stem having a gear 34 at its lower end rotatably mounted on a standard 35 having a pin projection 36 by which it may be bolted to the plate 32. A driving connection is established from the main spindle to the short spindle 33 by a gear 37 which may be disposed, as shown in Fig. 6, to mesh with the gears 13 and 34. The gear wheels are preferably protected from dirt and chips which fall from the drill by a box or casing 38 which is secured to the plate 32 and through which the spindle projection 14 extends.

Assuming that a large number of slate or soapstone disks such as the disk 39 of Fig. 4 are to be similarly drilled to receive a plurality of contact members, a metal disk or templet 40 is first provided in which the desired holes have been bored and which is provided with a plurality of peripheral notches 41 which correspond in number and relative position to the holes. A stationary finger 42 is mounted on the carriage and is adapted to engage the peripheral notches 41 in the templet 40. The notches 41, in coöperation with the finger 42, constitute position-accentuating means for the templet 40, whereby the templet is maintained in any of its adjusted positions. If the carriage is now adjusted so that one of the holes in the templet comes directly above the axis of the spindle, the soap-stone disk which is to be drilled may be clamped to the templet by a central bolt 43 and drilled upwardly, as shown in Fig. 1. It is found in practice that holes may be easily drilled through soap-stone and marble several inches in thickness by means of the machine described above, while, with ordinary machines, great difficulty is experienced, and a considerable length of time is required to do the same work. As soon as one hole is completed, the templet is rotated until the finger 42 comes into engagement with another notch in its periphery, whereupon another hole is drilled, and so on, until the work is completed.

It will be readily understood that the utility of the machine illustrated is not restricted to work of any particular form or substance, and, when a number of pieces are to be provided with only two or three holes bearing the same relation to each other in each piece, the auxiliary spindles, such as that shown in Figs. 6 and 7, may be employed in order that all of the holes may be drilled simultaneously.

Variations in the size and arrangement of parts may be effected in the machine illustrated and described without departing from the spirit of my invention, and I desire that only such limitations shall be imposed as are indicated in the appended claims.

I claim as my invention:

1. A drill press comprising a vertical spindle adapted to receive a drill at its upper end and capable of vertical adjustment, a carriage adjustable laterally in a horizontal plane above the drill, and a templet rotatively adjustable on said carriage and provided with position-accentuating means.

2. A drill press comprising a vertical main spindle adapted to receive a drill at its upper end, a supporting bracket, a spindle sleeve mounted in said bracket, means for vertically adjusting said sleeve and its spindle, a driving pulley for said spindle, a plate supported upon said sleeve, an auxiliary spindle detachably mounted upon said plate and having means for gearing it to the main spindle, a horizontal carriage above the drill, and means for adjusting the carriage to overhang the drill.

3. A drill press comprising a main spindle adapted to receive a drill at its upper end, driving means therefor, a vertically adjustable sleeve for said spindle, a plate mounted on said sleeve, and an auxiliary spindle detachably mounted on said plate and geared to the main spindle.

4. A drill press comprising a main vertical spindle adapted to receive a drill at its upper end, a non-rotative and vertically adjustable bearing sleeve for said spindle, a horizontal plate secured to the sleeve, and an auxiliary spindle detachably supported upon the plate and operatively connected to the main spindle to be driven thereby.

In testimony whereof, I have hereunto subscribed my name this 19th day of Jan. 1910.

BENJAMIN WEHNER.

Witnesses:
J. D. SUMMERVILLE,
B. B. HINES.